US006006259A

United States Patent [19]
Adelman et al.

[11] Patent Number: 6,006,259
[45] Date of Patent: Dec. 21, 1999

[54] METHOD AND APPARATUS FOR AN INTERNET PROTOCOL (IP) NETWORK CLUSTERING SYSTEM

[75] Inventors: Kenneth Allen Adelman, Corralitos; David Lyon Kashtan, La Selva Beach; William L. Palter; Derrell D. Piper, II, both of Santa Cruz, all of Calif.

[73] Assignee: Network Alchemy, Inc., Santa Cruz, Calif.

[21] Appl. No.: 09/196,941

[22] Filed: Nov. 20, 1998

[51] Int. Cl.[6] ........................................... G06F 13/00
[52] U.S. Cl. ....................................................... 709/223
[58] Field of Search ................................... 709/200, 201, 709/202, 203, 206, 208, 209, 217, 218, 219, 220, 221, 223, 224, 225

[56] References Cited

U.S. PATENT DOCUMENTS

| | | | |
|---|---|---|---|
| 4,817,091 | 3/1989 | Katzman et al. | 714/8 |
| 4,860,201 | 8/1989 | Stolfo et al. | 712/11 |
| 5,083,265 | 1/1992 | Valiant | 712/21 |
| 5,301,337 | 4/1994 | Wells et al. | 709/104 |
| 5,553,239 | 9/1996 | Heath et al. | 713/201 |
| 5,612,865 | 3/1997 | Dasgupta | 700/79 |
| 5,666,486 | 9/1997 | Alfieri et al. | 709/217 |
| 5,699,500 | 12/1997 | Dasgupta | 714/1 |
| 5,708,659 | 1/1998 | Rostoker et al. | 370/392 |
| 5,712,981 | 1/1998 | McKee et al. | 709/241 |
| 5,805,785 | 9/1998 | Dias et al. | 714/4 |
| 5,822,531 | 10/1998 | Gorczyca et al. | 709/221 |
| 5,828,876 | 10/1998 | Fish et al. | 709/216 |
| 5,832,222 | 11/1998 | Dziadosz et al. | 709/216 |
| 5,848,233 | 12/1998 | Radia et al. | 713/201 |

OTHER PUBLICATIONS

Andresen, D., et al., "Toward a Scalable Distributed WWW Server on Workstation Clusters," Journal of Parallel and Distributed Computing, Article No. PC971305, vol. 42, 1997 at 91–100.

Cardellini, V., et al., "Efficient State Estimators for Load Control Policies in Scalable Web Server Clusters," 22nd Annual International Computer Software & Applications Conference (Compsac '98), Aug. 19–21, 1998 at 449–455.

Cardoza, W., et al., "Overview of Digital UNIX cluster System Architecture," Proceedings of COMPCON '96, Feb. 25–28, 1996 at 254–259.

(List continued on next page.)

*Primary Examiner*—Moustafa M. Meky
*Attorney, Agent, or Firm*—Erwin J. Basinski; Morrison & Foerster LLP

[57] ABSTRACT

The present invention is an Internet Protocol (IP) network clustering system which can provide a highly scalable system which optimizes message throughput by adaptively load balancing its components, and which minimizes delay and packet loss especially in the TCP mode by a controlled fail-over process. An innovative process of defining the essential portion of TCP state required to maintain reliable message connections across the cluster is also disclosed.

16 Claims, 12 Drawing Sheets

OTHER PUBLICATIONS

Chun, B.N., et al., "Virtual Network Transport Protocols for Myrinet," IEEE Micro, Jan./Feb. 1998 at 53–63.

Cisco Systems Inc., "LocalDirector Hot–Standby Faiilover: Product Overview," www.cisco.com/univercd/cc/td/doc/product/iaabu/localdir/ld20rns/ldicgd/ld3_ch5.htm, 1998.

Damani, O., et al., "ONE–IP: techniques for hosting a service on a cluster of machines," Computer Networks and ISDN Systems, vol. 29, 1997 at 1019–1027.

Fox, A., et al., "Cluster–Based Scalable Network Services," 16th ACM Symposium on Operating systems Principles, Oct. 5–8, 1997 at 78–91.

Ghormley, D.P., et al., "GLUnix: A Global Layer Unix for a Network of Workstations," Software–Practice and Experience, vol. 28, No. 9, Jul. 25, 1998 at 929–961.

Huang, Y., et al., "Software Implemented Fault Tolerance: Technologies and Experience," 23rd International Symposium on Fault–Tolerant Computing, Jun. 22–24, 1993 at 2–9.

Hunt, G.D.H., et al., "Network Dispatcher: a connection router for scalable Internet services," Computer Networks and ISDN Systems, vol. 30, 1998 at 347–357.

Hwang, K., et al., *Scalable Parallel Computing*, WCB McGraw–Hill, 1998 at 366–377, 453–564.

Kurcewicz, M., et al., "A Distributed WWW Cache," Computer Networks and ISDN Systems, vol. 30, 1998 at 2261–2267.

Mendiratta, V.B., "Reliability Analysis of Clustered Computing Systems," 9th International Symposium on Software Reliability Engineering, Nov. 4–7, 1998 at 268–272.

Parker, T., "QualixHA+," Unix Review, Mar. 1998 at 59–61.

Short, R., et al., "Windows NT Clusters for Availability and Scalabilty," Proceedings, IEEE COMPCON '97, Feb. 23–26, 1997 at 8–13.

Taschek, J., "ZD Internet Lab; A Well–Balanced Web," www.zdnet.com/icom/zdlabs/load.balance/, Feb. 23, 1998.

Thaler, D.G., et al., "Using Name–Based Mappings to Increase Hit Rates," IEEE/ACM Transactions on Networking, vol. 6, No. 1, Feb. 1998 at 1–14.

Valence Research, Inc., "Convoy Cluster Software; Product Overview," www.valence.com/convoy/main.html.

Venkataraman, S., et al., "Memory Management for Scalable Web Data Servers," 13th International Conference on Data Engineering, Apr. 7–11, 1997 at 510–519.

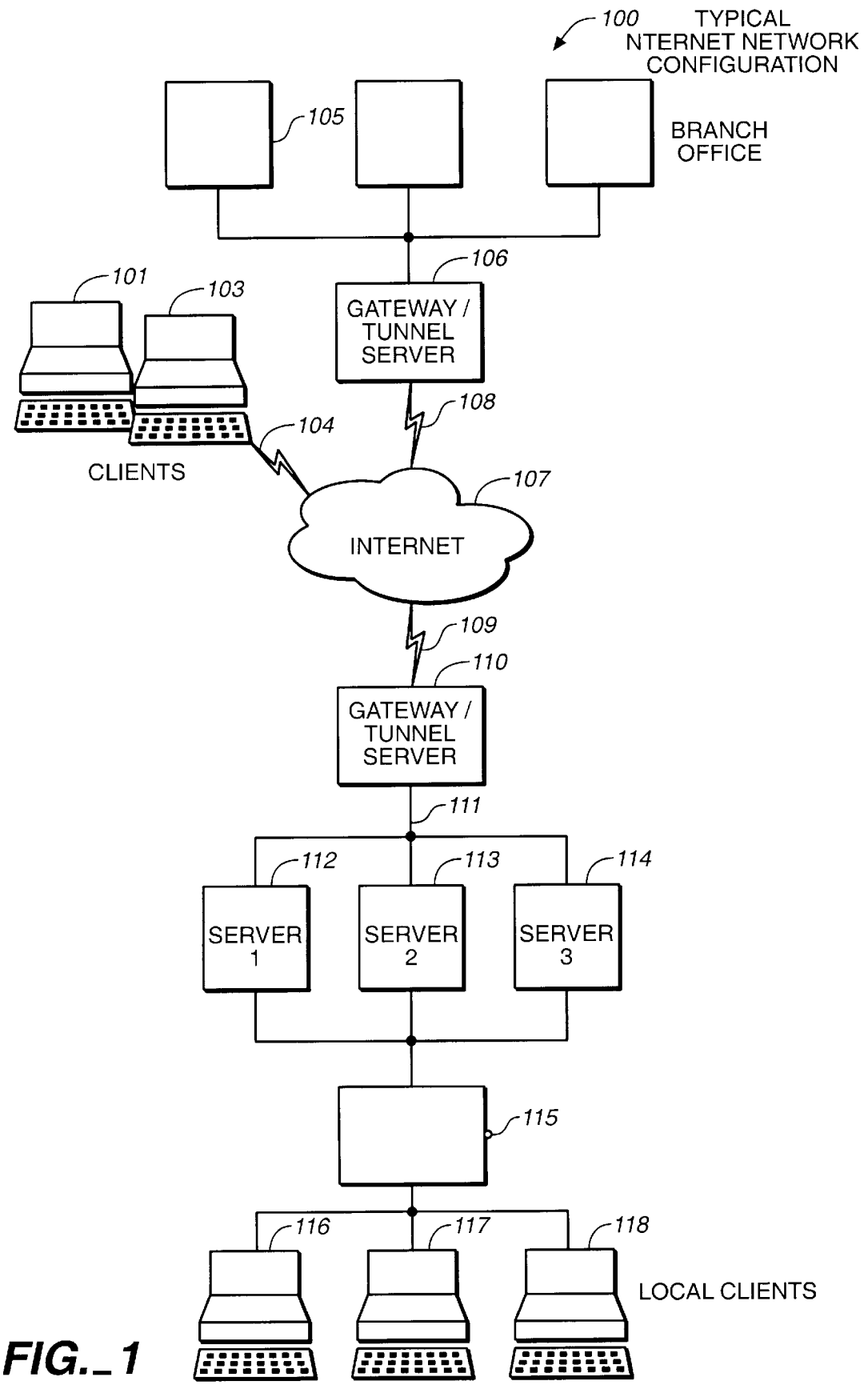
FIG._1

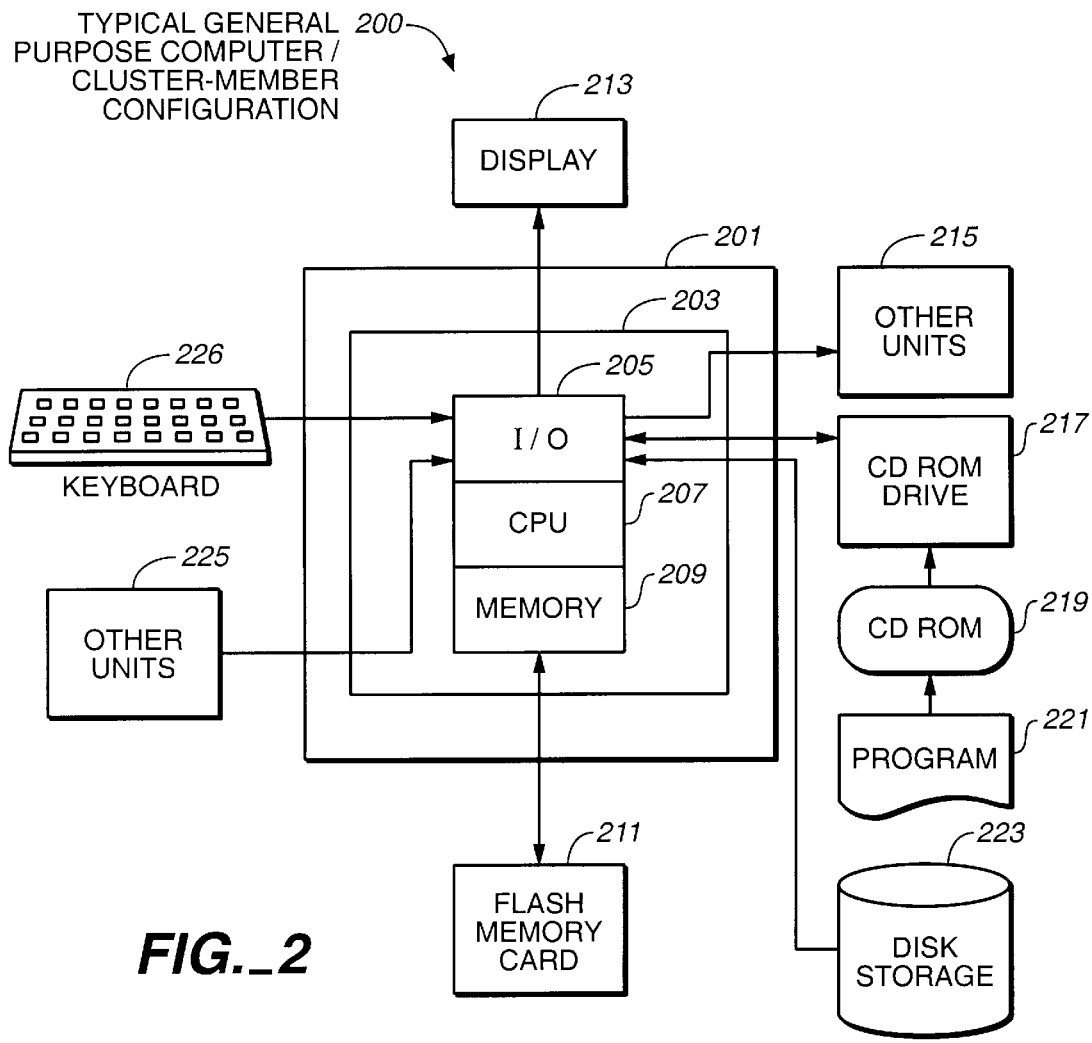
TYPICAL GENERAL PURPOSE COMPUTER / CLUSTER-MEMBER CONFIGURATION 200
FIG._2
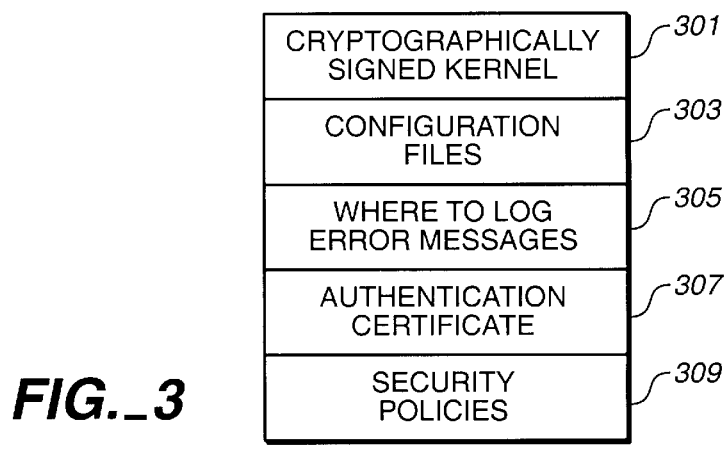
FLASH MEMORY – CONTENTS 300
FIG._3

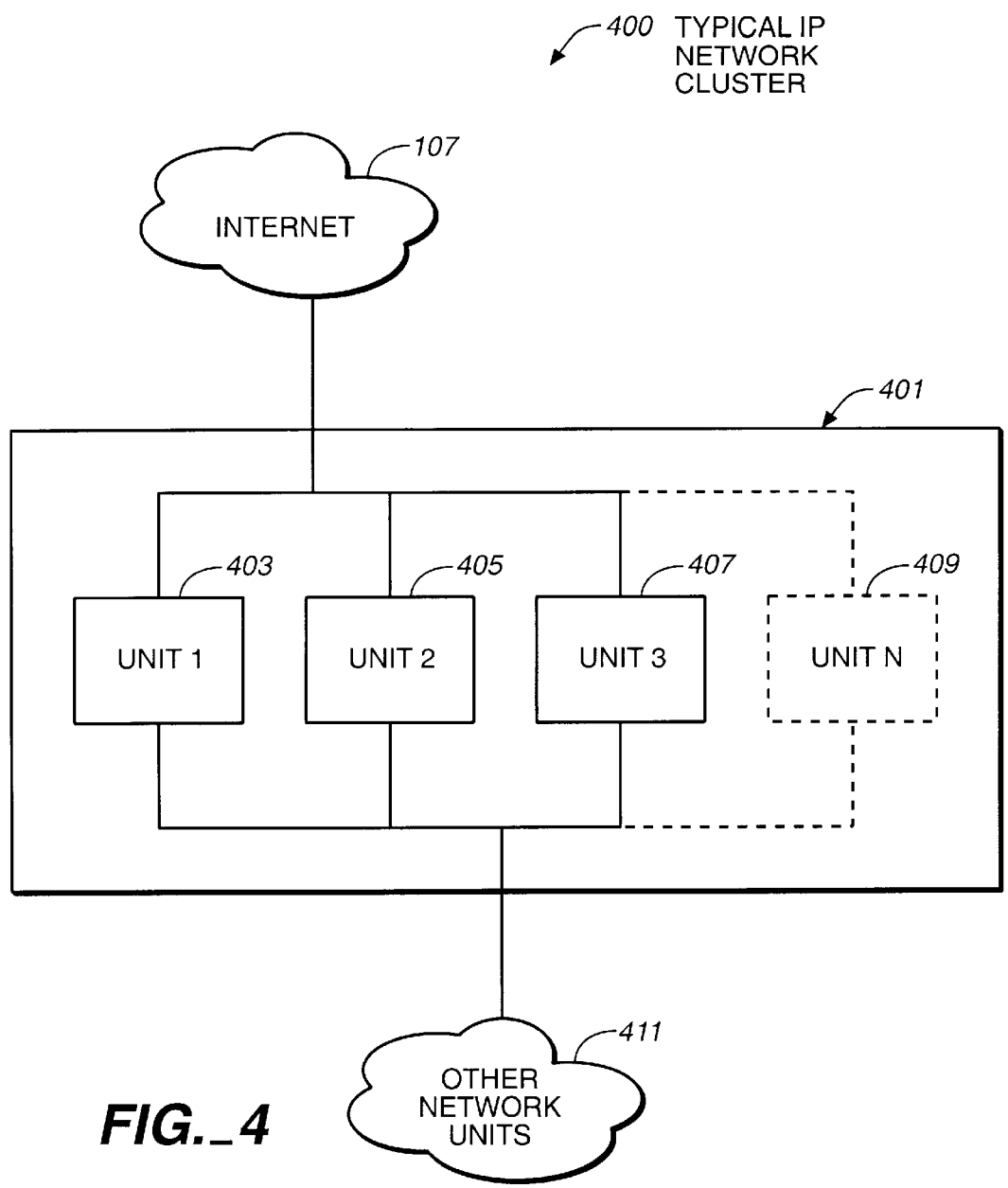
FIG._4

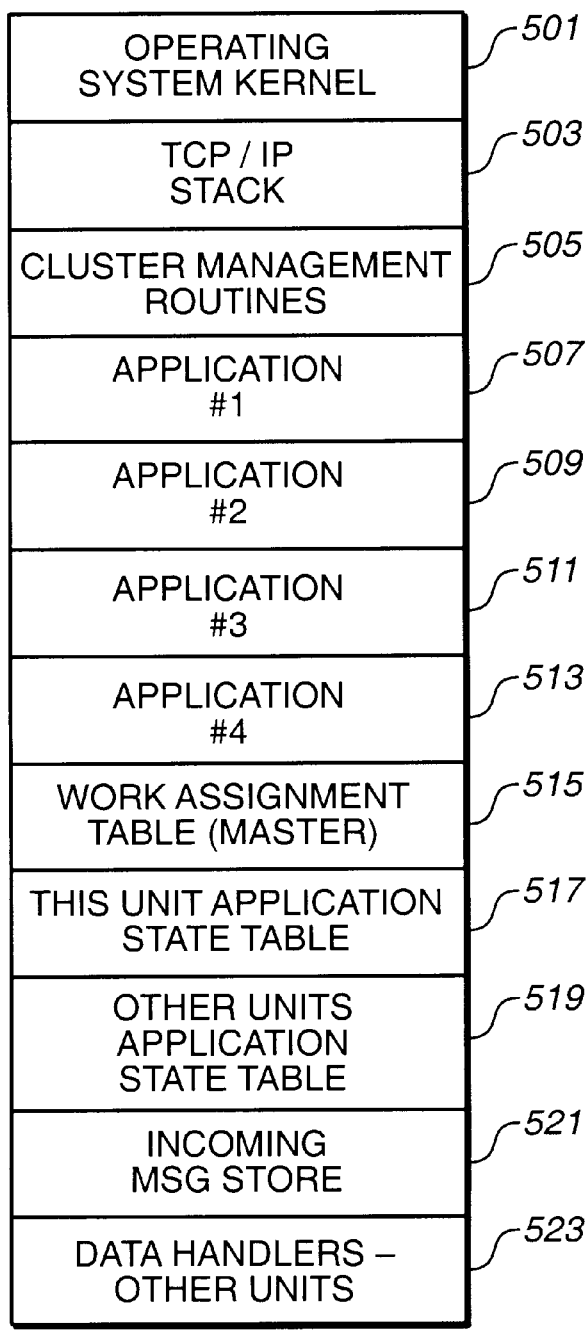
FIG._5

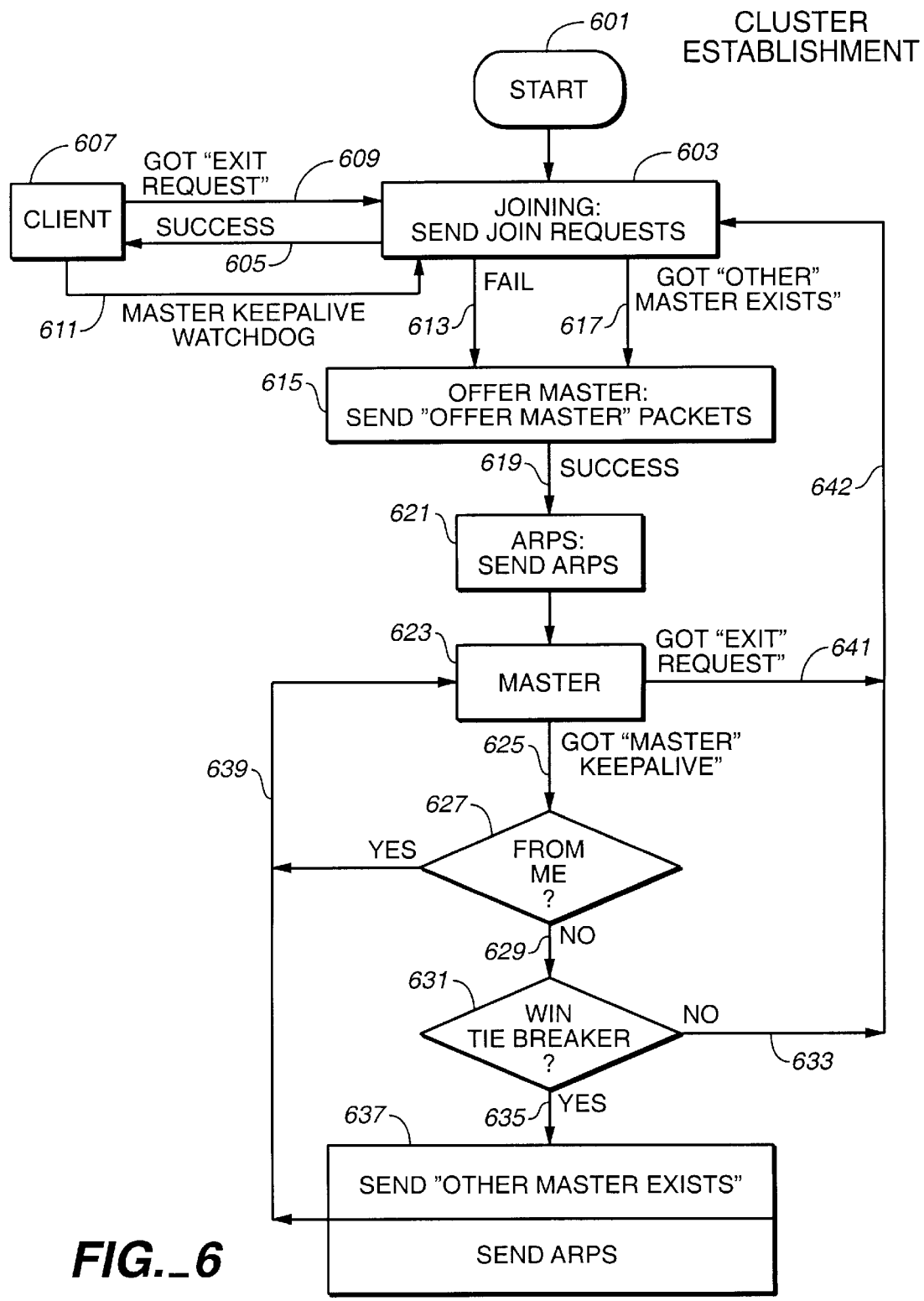
FIG._6

TCP FAILOVER STATE — 700

Initial State (Only need to send once) — 702

Source IP Address + Port
Destination IP Address + Port
Maximum Segment Size
MSS + Options Size

Essential State (Send on each state change) — 701

Flags: No Delay, No Options, Request Window Scaling,
 Receive Window Scaling, Request Timestamp,
 Receive Timestamp, Permit Selective ACK
Send "Next" Sequence Number
Window Update Segment Sequence Number
Window Update Segment Acknowledgement Number
Send Window
Receive "Next" Sequence Number
Receive "Advertized" Window
Send Window Scaling
Receive Window Scaling
Recent Timestamp Echo Data Calculable State (Don't Send) — 703

State = ESTABLISHED
Retransmit Time = None
Probe Time = Now
TCP Keepalive Time = Now
2MSL Time = None
Retransmit Time Shift = 0
Current Retransmit = Initial Value
Consecutive Duplicate Acks Received = 0
Force Output = 0;
Send "Unacknowledged" Sequence Number = Send "Next" Sequence Number
Send "Urgent Pointer" = Send "Unacknowledged" Sequence Number
Highest Sequence Number Sent = Send "Next" Sequence Number
Send Initial Segment Sequence Number = 0
Receive Window = Amount of space left in socket receive buffer
Receive "Urgent Pointer" = Receive "Next" Sequence Number
Receive Initial Segment Sequence Number = 0
Congestion Control Window = Initial Value
Congestion Control Window Linear/Exponential Threshold = Initial Value
Inactivity Time = 0
Estimated Round Trip Time = 0
Sequence Number Being Timed = 0
Smoothed Round Trip Time = Initial Value
Variance In Round Trip Time = Initial Value
Minimum Round Trip Time Allowed = Initial Value
Largest Window Offered by Peer = 0
Out Of Band Data = None
Send Pending Window Scaling = Send Window Scaling
Receive Pending Window Scaling = Receive Window Scaling
Timestamp Echo Data Update Time = 0
Last Ack Sent Sequence Number = Receive "Next" Sequence Number
Send Connection Count = 0
Receive Connection Count = 0;
Connection Duration = 0;
Number of Round Trip Time Samples = 0;
Number of TCP Keepalive Probes = Initial Value
Interval Between TCP Keepalive Probes = Initial Value
Time Before First TCP Keepalive Probe = Initial Value
Maximum Idle Time = Initial Value

FIG._7B

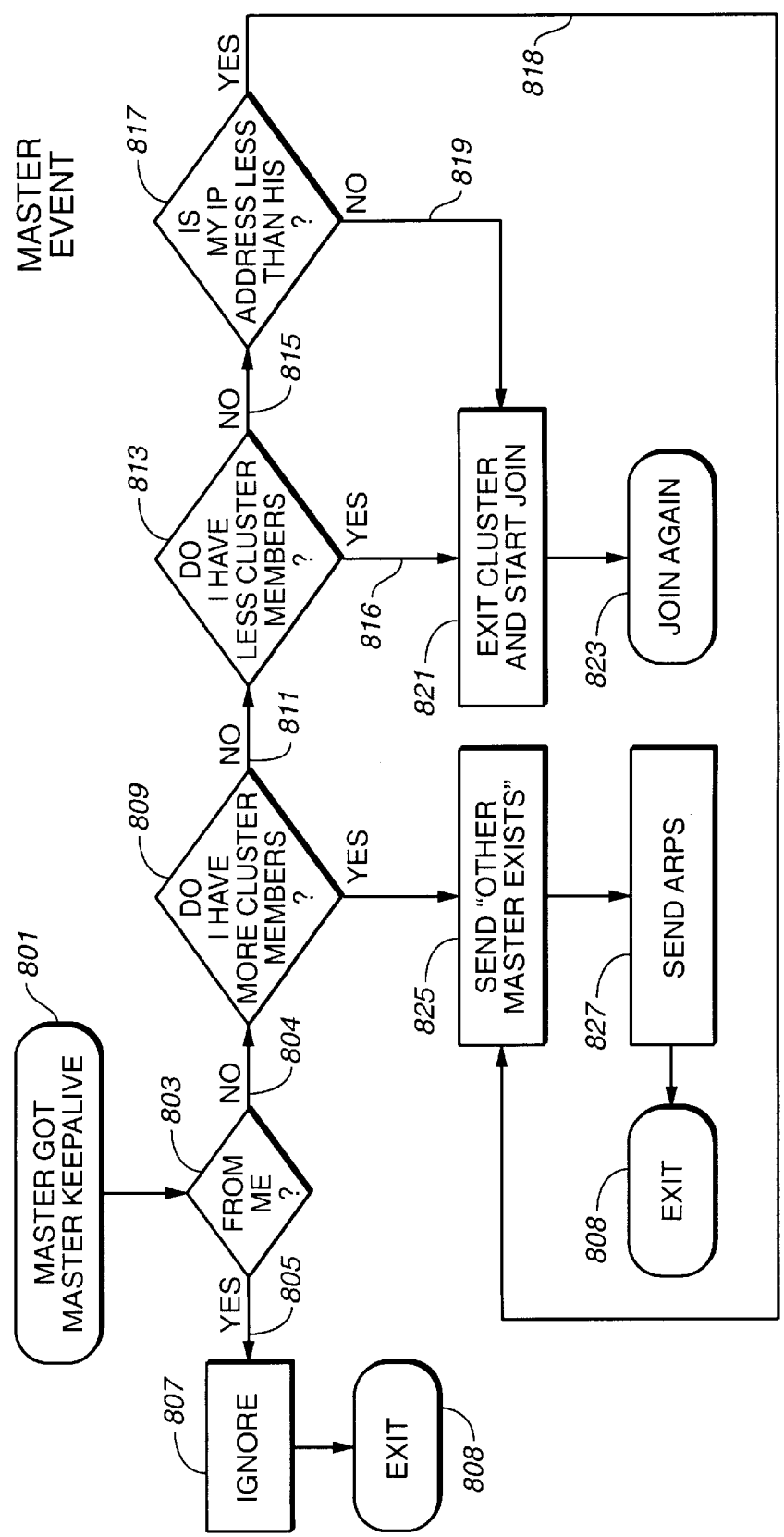
FIG._8A

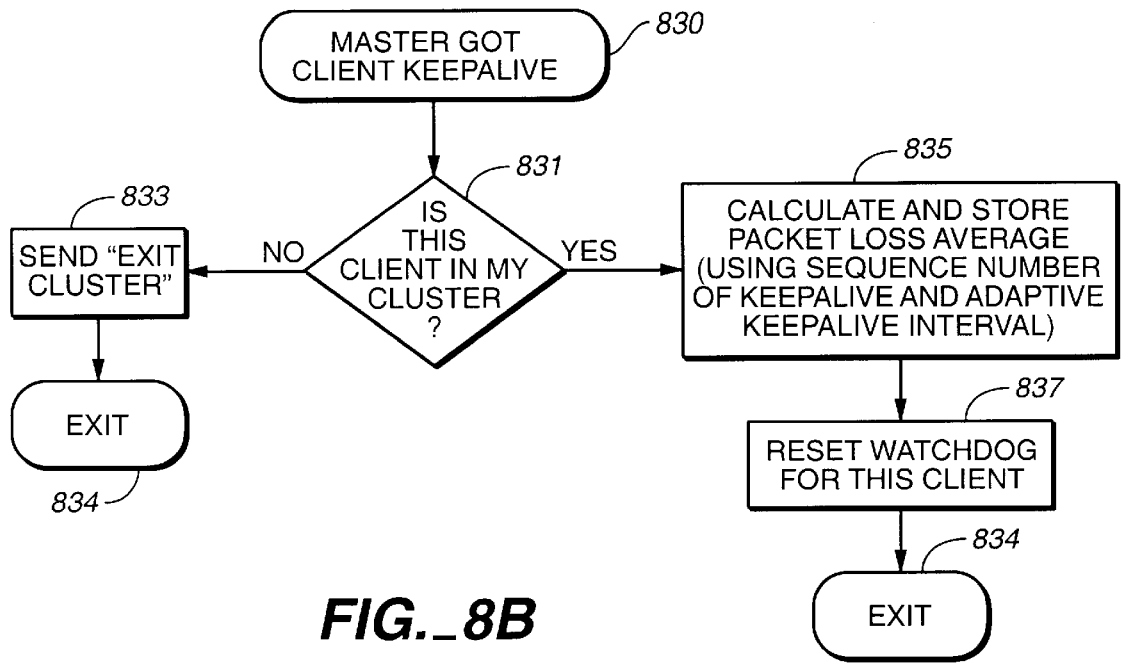
FIG._8B
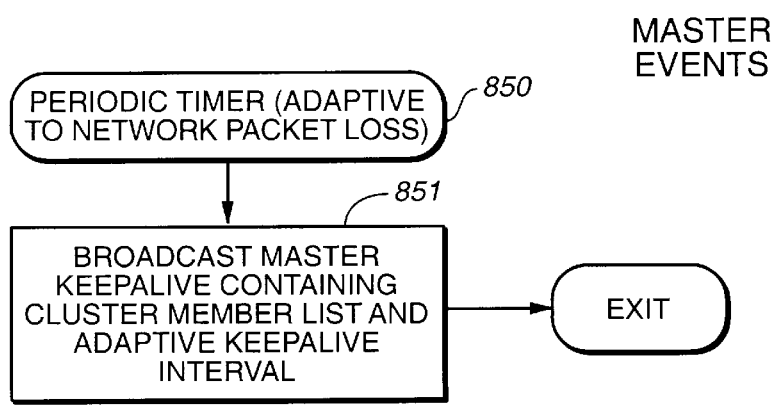
FIG._8C

FIG._8D
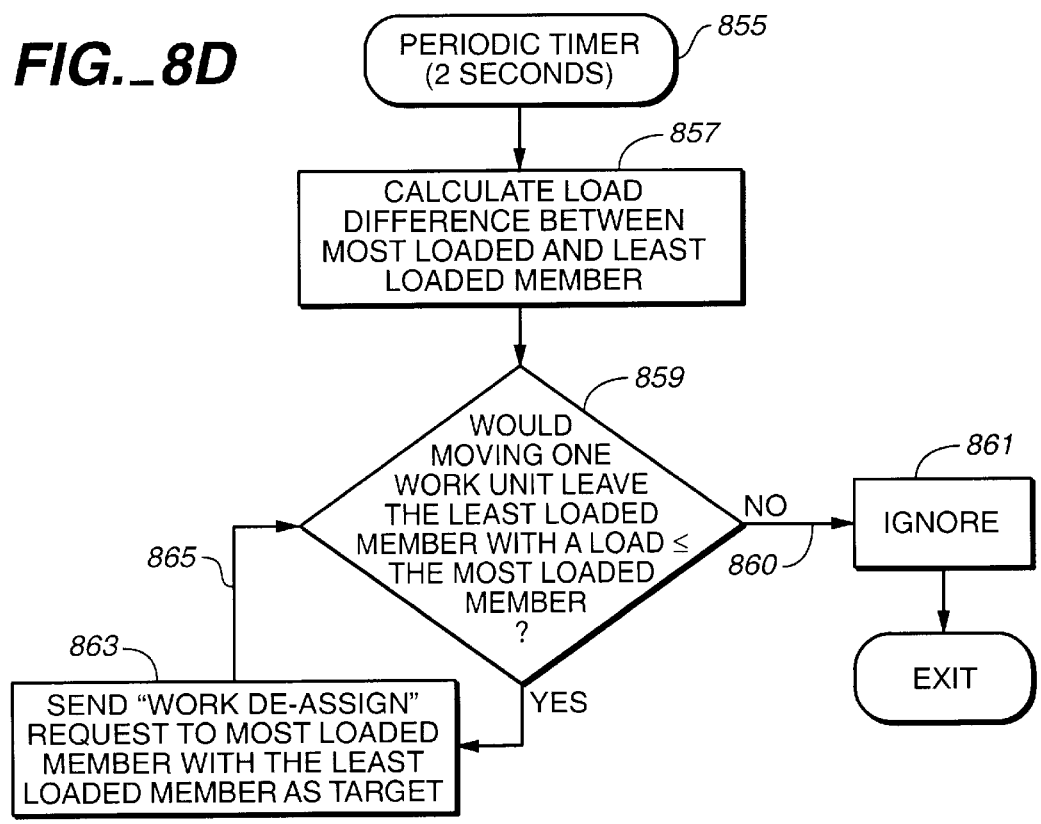
FIG._8E
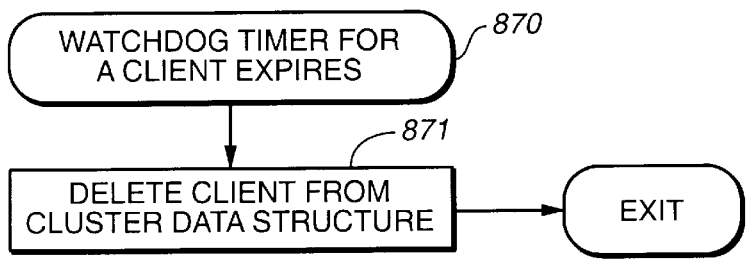
FIG._8H
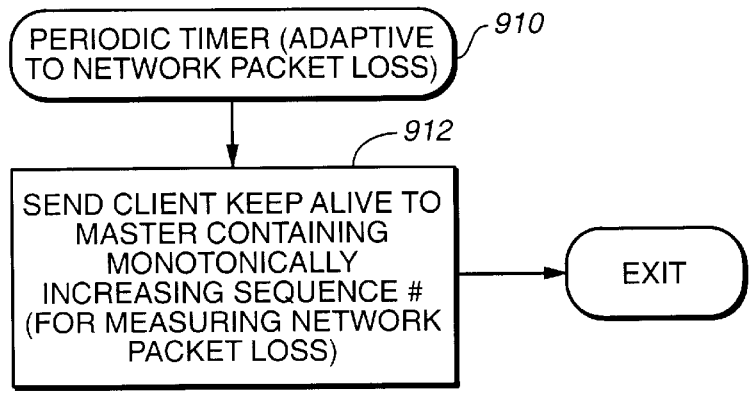

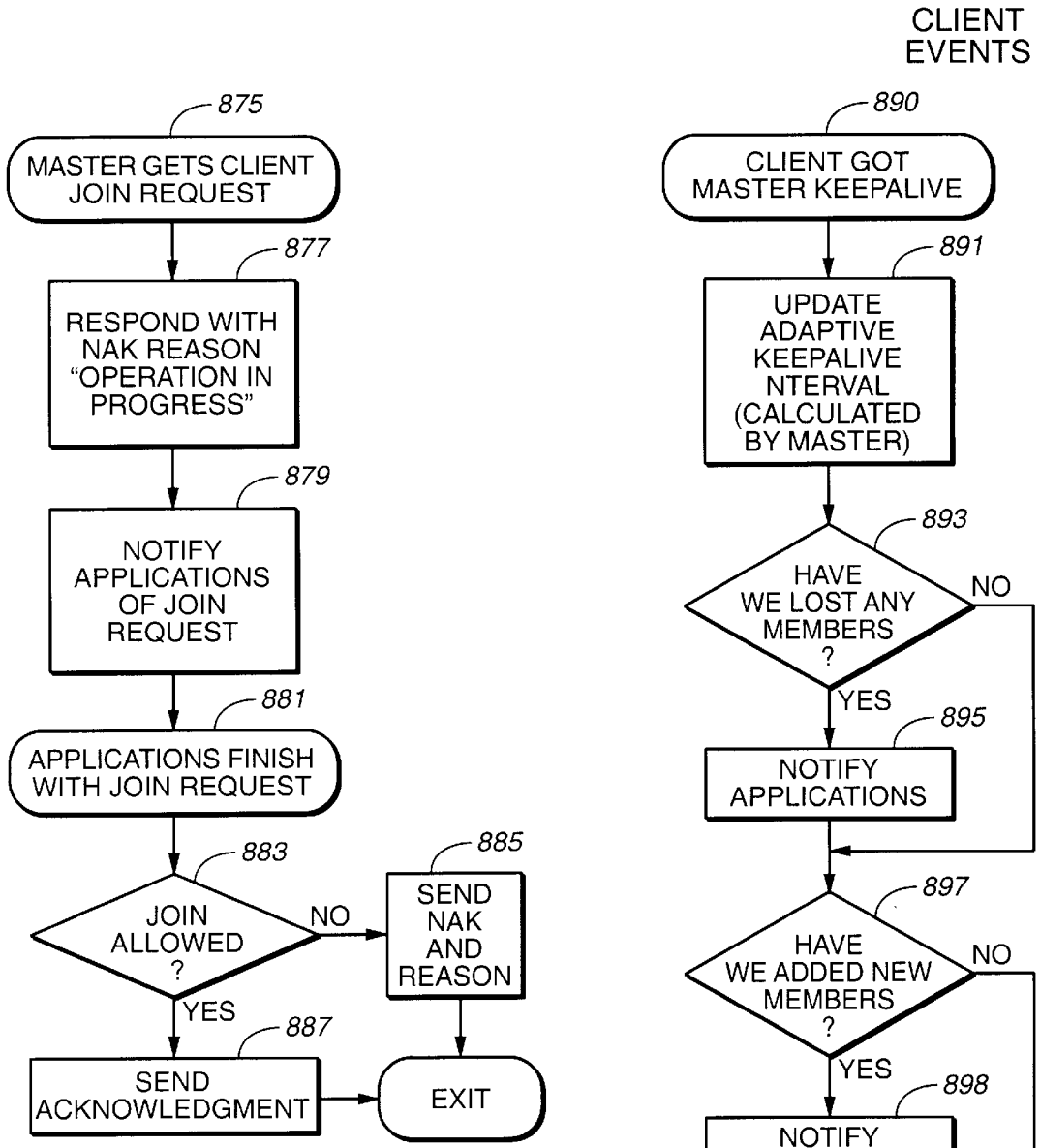
FIG._8F
FIG._8G
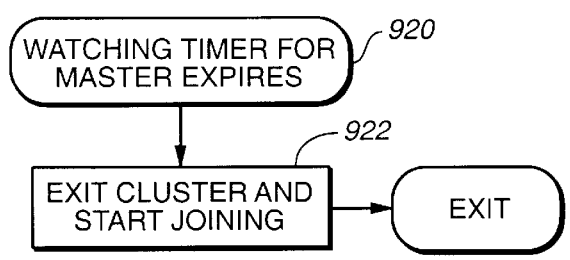
FIG._8I

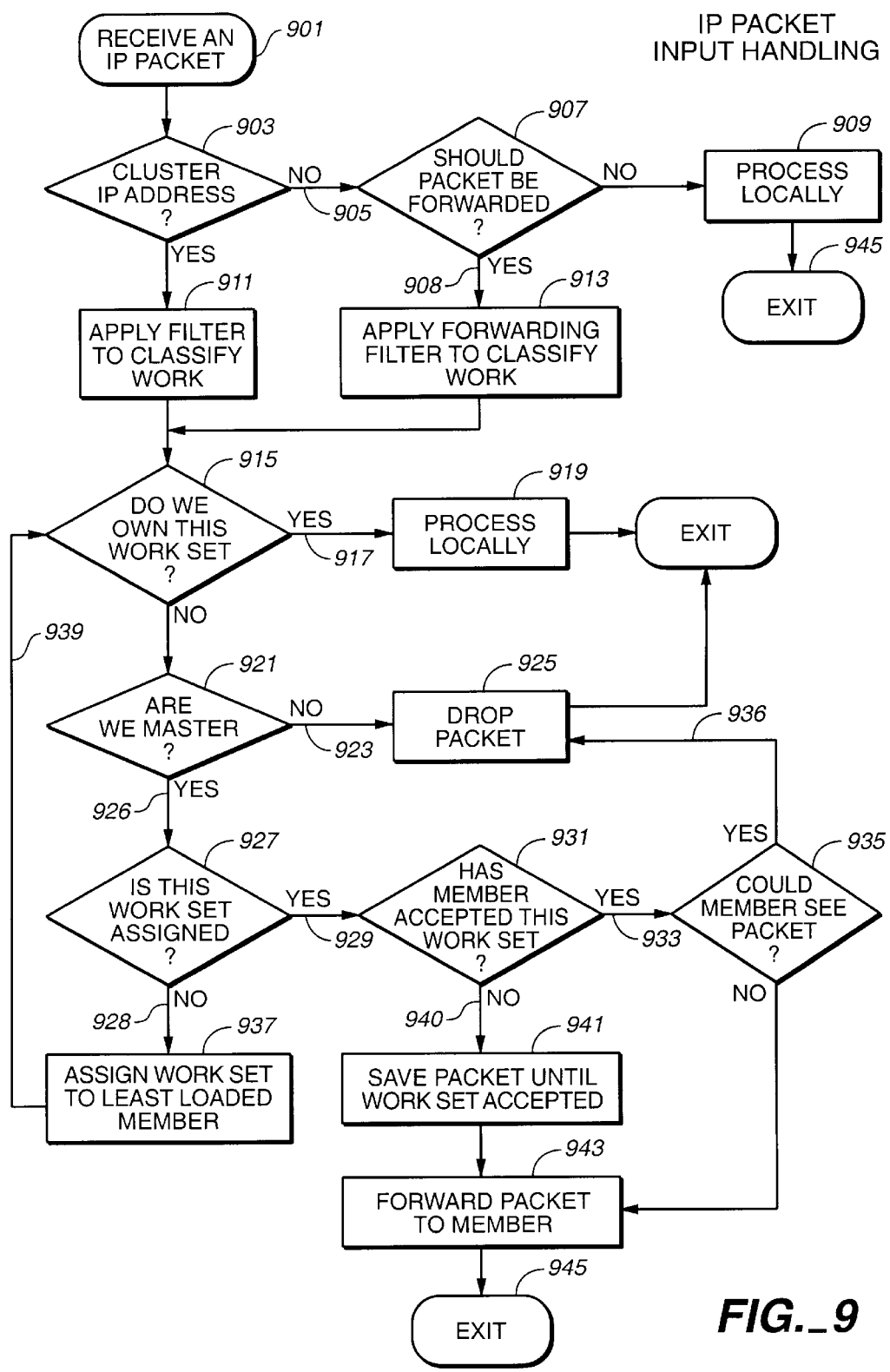
FIG._9

METHOD AND APPARATUS FOR AN INTERNET PROTOCOL (IP) NETWORK CLUSTERING SYSTEM

CROSS-REFERENCE TO RELATED APPLICATIONS

This application is related to application Ser. No. 09/197,018 entitled "Method and Apparatus for TCP/IP load balancing in an IP Network Clustering System," concurrently filed Nov. 20, 1998, and still pending.

TECHNICAL FIELD

This invention relates to the field of Computer Systems in the general Network Communications sector. More specifically, the invention is a method and apparatus for an Internet Protocol (IP) Network clustering system.

BACKGROUND ART

As more and more businesses develop electronic commerce applications using the Internet in order to market and to manage the ordering and delivery of their products, these businesses are searching for cost-effective Internet links that provide both security and high availability. Such mission-critical applications need to run all day, every day with the network components being highly reliable and easily scalable as the message traffic grows. National carriers and local Internet Service Providers (ISPs) are now offering Virtual Private Networks (VPN)—enhanced Internet-based backbones tying together corporate workgroups on far-flung Local Area Networks (LANs)—as the solution to these requirements.

A number of companies have recently announced current or proposed VPN products and/or systems which variously support IPSec, IKE (ISAKMP/Oakley) encryption-key management, as well as draft protocols for Point-to-Point Tunneling protocol (PPTP), and Layer 2 Tunneling protocol (L2TP) in order to provide secure traffic to users. Some of these products include IBM's Nways Multiprotocol Routing Services™2.2, Bay Networks Optivity™ and Centillion™ products, Ascend Communication's MultiVPN™ package, Digital Equipment's ADI VPN product family, and Indus River's RiverWorks™ VPN planned products. However, none of these products are known to offer capabilities which minimizes delay and session loss by a controlled fail-over process.

These VPNs place enormous demands on the enterprise network infrastructure. Single points of failure components such as gateways, firewalls, tunnel servers and other choke points that need to be made highly reliable and scaleable are being addressed with redundant equipment such as "hot standbys" and various types of clustering systems.

For example, CISCO™ Inc. now offers a new product called LocalDirector™ which functions as a front-end to a group of servers, dynamically load balances TCP traffic between servers to ensure timely access and response to requests. The LocalDirector provides the appearance, to end users, of a "virtual" server. For purposes of providing continuous access if the LocalDirector fails, users are required to purchase a redundant LocalDirector system which is directly attached to the primary unit, the redundant unit acting as a "hot" standby. The standby unit does no processing work itself until the master unit fails. The standby unit uses the failover IP address and the secondary Media Access Control (MAC) address (which are the same as the primary unit), thus no Address Resolution Protocol (ARP) is required to switch to the standby unit. However, because the standby unit does not keep state information on each connection, all active connections are dropped and must be re-established by the clients. Moreover, because the "hot standby" does no concurrent processing it offers no processing load relief nor scaling ability.

Similarly, Valence™ Research Inc. (recently purchased by Microsoft® Corporation) offers a software product called Convoy Cluster™ (Convoy). Convoy installs as a standard Windows NT networking driver and runs on an existing LAN. It operates in a transparent manner to both server applications and TCP/IP clients. These clients can access the cluster as if it is a single computer by using one IP address. Convoy automatically balances the networking traffic between the clustered computers and can rebalance the load whenever a cluster member comes on-line or goes off-line. However this system appears to use a compute intensive and memory wasteful method for determining which message type is to be processed by which cluster member in that the message source port address and destination port address combination is used as an index key which must be stored and compared against the similar combination of each incoming message to determine which member is to process the message. Moreover, this system does not do failover.

There is a need in the art for an IP network cluster system which can easily scale to handle the exploding bandwidth requirements of users. There is a further need to maximize network availability, reliability and performance in terms of throughput, delay and packet loss by making the cluster overhead as efficient as possible, because more and more people are getting on the Internet and staying on it longer. A still further need exists to provide a reliable failover system for TCP based systems by efficiently saving the state information on all connections so as to minimize packet loss and the need for reconnections.

Computer cluster systems including "single-system-image" clusters are known in the art. See for example, "Scalable Parallel Computing" by Kai Hwang & Zhiwei Xu, McGraw-Hill, 1998, ISBN 0-07-031798-4, Chapters 9 & 10, Pages 453–564, which are hereby incorporated fully herein by reference. Various Commercial Cluster System products are described therein, including DEC's TruClusters™ system, IBM's SP™ system, Microsoft's Wolfpack™ system and The Berkeley NOW Project. None of these systems are known to provide efficient IP Network cluster capability along with combined scalability, load-balancing and controlled TCP fail-over.

SUMMARY OF THE INVENTION

The present invention overcomes the disadvantages of the above-described systems by providing an economical, high-performance, adaptable system and method for an IP Network cluster.

The present invention is an IP Network clustering system which can provide a highly scalable system which optimizes message throughput by adaptively load balancing its components, and which minimizes delay and packet loss especially in the TCP mode by a controlled fail-over process. No other known tunnel-server systems can provide this combined scalability, load-balancing and controlled failover.

The present invention includes a cluster apparatus comprising a plurality of cluster members, with all cluster members having the same internet machine name and IP address, and each member having a general purpose processor, a memory unit, a program in the memory unit, a display and an input/output unit; and the apparatus having a filter mechanism in each cluster member which uses a highly efficient hashing mechanism to generate an index number for each message session where the index number is used to determine whether a cluster member is to process a particular message or not. The index number is further used to designate which cluster member is responsible for processing the message and is further used to balance the processing load over all present cluster members.

The present invention further includes a method for operating a plurality of computers in an IP Network cluster which provides a single-system-image to network users, the method comprising steps to interconnect the cluster members, and assigning all cluster members the same internet machine name and IP address whereby all cluster members can receive all messages arriving at the cluster and all messages passed on by the members of the cluster appear to come from a single unit, and to allow them to communicate with each other; to adaptively designate which cluster member will act as a master unit in the cluster; and the method providing a filter mechanism in each cluster member which uses a highly efficient hashing mechanism to generate an index number for each message session where the index number is used to determine whether a cluster member is to process a particular message or not. The index number is further used to designate which cluster member is responsible for processing which message type and is further used to balance the processing load over all present cluster members.

Other embodiments of the present invention will become readily apparent to those skilled in these arts from the following detailed description, wherein is shown and described only the embodiments of the invention by way of illustration of the best mode known at this time for carrying out the invention. The invention is capable of other and different embodiments some of which may be described for illustrative purposes, and several of the details are capable of modification in various obvious respects, all without departing from the spirit and scope of the present invention.

BRIEF DESCRIPTION OF THE DRAWINGS

The features and advantages of the system and method of the present invention will be apparent from the following description in which:

FIG. 1 illustrates a typical Internet network configuration.

FIG. 2 illustrates a representative general purpose computer/cluster-member configuration.

FIG. 3 illustrates a representative memory map of data contained on a related Flash Memory card.

FIG. 4 illustrates a typical IP Network cluster

FIG. 5 illustrates a general memory map of the preferred embodiment of a cluster member acting as a tunnel-server.

FIG. 6 illustrates a flow-chart of the general operation of the cluster indicating the cluster establishment process.

FIG. 7 illustrates an exemplary TCP state data structure.

FIGS. 8A–8I illustrate flow-charts depicting the events which the master processes and the events which the non-master cluster members (clients) must process.

FIGS. 9 illustrates a flow-chart depicting the normal packet handling process after establishing the cluster.

BEST MODE FOR CARRYING OUT THE INVENTION

A method and apparatus for operating an Internet Protocol (IP) Network cluster is disclosed. In the following description for purposes of explanation, specific data and configurations are set forth in order to provide a thorough understanding of the present invention. In the presently preferred embodiment the IP Network cluster is described in terms of a VPN tunnel-server cluster. However, it will be apparent to one skilled in these arts that the present invention may be practiced without the specific details, in various applications such as a firewall cluster, a gateway or router cluster, etc. In other instances, well-known systems and protocols are shown and described in diagrammatical or block diagram form in order not to obscure the present invention unnecessarily.

Operating Environment

The environment in which the present invention is used encompasses the general distributed computing scene which includes generally local area networks with hubs, routers, gateways, tunnel-servers, applications servers, etc. connected to other clients and other networks via the Internet, wherein programs and data are made available by various members of the system for execution and access by other members of the system. Some of the elements of a typical internet network configuration are shown in FIG. 1, wherein a number of client machines 105 possibly in a branch office of an enterprise, are shown connected to a Gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a home office via an ISP connection 109 to a gateway/tunnel-server 110 which is connected 111 to various enterprise application servers 112, 113, 114 which could be connected through another hub/router 115 to various local clients 116, 117, 118.

The present IP Network cluster is made up of a number of general purpose computer units each of which includes generally the elements shown in FIG. 2, wherein the general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

Flash memory units typically contain additional data used for various purposes in such computer systems. In the preferred embodiment of the present invention, the flash memory card is used to contain certain unit "personality" information which is shown in FIG. 3. Generally the flash card used in the current embodiment contains the following type of information:

Cryptographically signed kernel—(301)

Configuration files (such as cluster name, specific unit IP address, cluster address, routing information configuration, etc.)—(303)

Pointer to error message logs—(305)

Authentication certificate—(307).

Security policies (for example, encryption needed or not, etc.)—(309)

The Invention

The present invention is an Internet Protocol (IP) clustering system which can provide a highly scalable system which optimizes throughput by adaptively load balancing its components, and which minimizes delay and session loss by a controlled fail-over process. A typical IP cluster system of the preferred embodiment is shown in FIG. 4 wherein the internet 107 is shown connected to a typical IP cluster 401 which contains programmed general purpose computer units 403, 405, 407, 409 which act as protocol stack processors for message packets received. The IP cluster 401 is typically connected to application servers or other similar type units 411 in the network. In this figure it is shown that there purposes of further illustration the cluster will be depicted as having three units, understanding that the cluster of the present invention is not limited to only three units. Also for purposes of illustration the preferred embodiment will be described as a cluster whose applications may be VPN tunnel protocols however it should be understood that this cluster invention may be used as a cluster whose application is to act as a Firewall, or to act as a gateway, or to act as a security device, etc.

In the preferred embodiment of the present invention, each of the cluster members is a computer system having an Intel motherboard, two Intel Pentium™ processors, a 64 megabyte memory and two Intel Ethernet controllers, and two HiFn cryptographic processors. The functions performed by each processor are generally shown by reference to the general memory map of each processor as depicted in FIG. 5. Each cluster member has an Operating System kernel 501, TCP/IP stack routines 503 and various cluster management routines (described in more detail below) 505, program code for processing application #1 507, which in the preferred embodiment is code for processing the IPSec protocol, program code for processing application #2 509, which in the preferred embodiment is code for processing the PPTP protocol, program code for processing application #3 511, which in the preferred embodiment is code for processing the L2TP protocol, and program code for processing application #4 513, which in the preferred embodiment is code space for processing an additional protocol such as perhaps a "Mobile IP" protocol. Detailed information on these protocols can be found through the home page of the IETF at "http://www.ietf.org". The following specific protocol descriptions are hereby incorporated fully herein by reference:

"Point-to-Point Tunneling Protocol—PPTP", Glen Zorn, G. Pall, K. Hamzeh, W. Verthein, J. Taarud, W. Little, Jul. 28, 1998;

"Layer Two Tunneling Protocol", Allan Rubens, William Palter, T. Kolar, G. Pall, M. Littlewood, A. Valencia, K. Hamzeh, W. Verthein, J. Taarud, W. Mark Townsley, May 22, 1998;

Kent, S., Atkinson, R., "IP Authentication Header," draft-ietf-ipsec-auth-header-07.txt.

Kent, S., Atkinson, R., "Security Architecture for the Internet Protocol," draft-ietf-ipsec-arch-sec-07.txt.

Kent, S., Atkinson, R., "IP Encapsulating Security Payload (ESP)," draft-ietf-ipsec-esp-v2-06.txt.

Pereira, R., Adams, R., "The ESP CBC-Mode Cipher Algorithms," draft-ietf-ipsec-ciph-cbc-04.txt.

Glenn, R., Kent, S., "The NULL Encryption Algorithm and Its Use With IPsec," draft-ietf-ipsec-ciph-null-0.1.txt.

Madson, C., Doraswamy, N., "The ESP DES-CBC Cipher Algorithm With Explicit IV," draft-ietf-ipsec-ciph-des-expiv-02.txt.

Madson, C., Glenn, R., "The Use of HMAC-MD5 within ESP and Ali," draft-ietf-ipsec-auth-hmac-md5-96-03.txt.

Madson, C., Glenn, R., "The Use of HMAC-SHA-1-96 within ESP and AH," draft-ietf-ipsec-auth-hmac-sha 196-03.txt.

Harkins, D., Carrel, D., "The Internet Key Exchange (IKE)," draft-ietf-ipsec-isakmp-oakley-08.txt.

Maughan, D., Schertler, M., Schmeider, M., and Turner, J., "Internet Security Association and Key Management Protocol (ISAKMP)," draft-ietf-ipsec-isakmp-10.{ps,txt}.

H. K. Orman, "The OAKLEY Key Determination Protocol," draft-ietf-ipsec-oakley-02.txt.

Piper, D. "The Internet IP Security Domain of Interpretation for ISAKMP," draft-ietf-ipsec-ipsec-doi-10.txt.

Tunneling protocols such as the Point-to-Point Tunneling Protocol (PPTP) and Layer 2 Tunneling Protocol (L2TP) although currently only "draft" standards, are expected to be confirmed as official standards by the Internet Engineering Task Force (IETF) in the very near future, and these protocols together with the Internet Security Protocol (IPSec), provide the basis for the required security of these VPNs.

Referring again to FIG. 5, the preferred embodiment in a cluster member also contains a work assignment table 515 which contains the message/session work-unit hash numbers and the cluster member id assigned to that work-unit; a table containing the application state table for this cluster member 517; a similar application state table for the other members of the cluster 519; an area for containing incoming messages 521; and data handler routines for handling data messages from other members of the cluster 523. Those skilled in the art will recognize that various other routines and message stores can be implemented in such a cluster member's memory to perform a variety of functions and applications.

The general operation of the preferred embodiment of the IP cluster is now described in terms of (1) cluster establishment (FIG. 6) including processes for members joining the cluster and leaving the cluster; (2) master units events processing (FIGS. 8A–8F) and client units events processing (FIGS. 8G–8I); and (3) finally, normal message processing activity (FIG. 9).

Referring now to FIG. 6 the cluster establishment activity is depicted. At system start-up 601 cluster members try to join the cluster by sending (broadcasting) a "join request" message 603. This "join" message contains an authentication certificate obtained from a valid certificate authority. When the master unit receives this 'join" message it checks the certificate against a list of valid certificates which it holds and if it finds no match it simply tells him the join has failed. Note that normally when a system administrator plans to add a hardware unit to an existing cluster, he requests that his security department or an existing security certificate authority issue a certificate to the new unit and send a copy of the certificate to the master unit in the cluster. This process guarantees that someone could not illegally attach a unit to a cluster to obtain secured messages. If the master unit does match the certificate from the join message with a certificate it holds in its memory it sends an "OK to join" message. If a "OK to join" message is received 605 then this unit is designated a cluster member (client or non-master) 607. Note that each cluster member has a master-watchdog timer (i.e. a routine to keep track of whether the member got a keepalive message from the master during a certain interval, say within the last 200 milliseconds) and if the timer expires (i.e. no keepalive message from the master during the interval) it will mean that the master unit is dead 607 and the cluster member/client will try to join the cluster again (611). Another event that will cause the cluster member/client 607 to try to join up again is if it gets an "exit request" message (i.e. telling it to "leave the cluster") 609 If the member sending out the join request message (603) does not get a "OK to join" message 613 the member sends out (broadcasts) packets offering to become the master unit 615. If the member gets a "other master exists" message 617 the member tries to join again 603. If after the member sends out the packets offering to become the master, he gets no response for 100 milliseconds 619 he sends broadcast Address Resolution Protocol (ARP) responses to tell anyone on the network what Ethernet address to use for the cluster IP address 621 and now acts as the cluster master unit 623. If in this process the cluster member got no indication that another master exists (at 617) and now thinking it is the only master 623 but yet gets a message to "exit the cluster" 641 the member must return to try to join up again 642. This could happen for example, if this new master's configuration version was not correct. He would return, have an updated configuration and attempt to rejoin. Similarly, if this member who thinks he is the new master 623 gets a "master keepalive" message 625 (indicating that another cluster member thinks he is the master unit) then he checks to see if somehow the master keepalive message was from him 627 (normally the master doesn't get his own keepalive messages but it could happen) and if so he just ignores the message 639. If however the master keepalive message was not from himself 629 it means there is another cluster member who thinks he is the master unit and somehow this "tie" must be resolved. (This tie breaker process is described in more detail below with respect to "Master event" processing). If the tie is resolved in favor of the new cluster member who thinks he is the master 635 he sends an "Other master exists" message to the other master and once again sends broadcast Address Resolution Protocol (ARP) responses to tell anyone on the network what Ethernet address to use for the cluster IP address 637 (because that other master could have done the same). If this new cluster member who thinks he is the master loses the tie-breaker 633 then he must go and join up again to try to get the cluster stabilized. This process produces a single cluster member acting as the master unit and the other cluster members understanding they are merely members.

Master Unit Events Processing

After a cluster has formed, there are various events that occur which the master unit must address. How these are handled in the preferred embodiment are now described with reference to FIGS. 8A–8F. Referring to FIG. 8A the first master unit event describes the "tie-breaker" process when two cluster members claim to be the "master" unit. Recalling from above that the master normally does not receive his own "keepalive" message so that if a master gets a "master keepalive" message 801 it likely indicates that another cluster member thinks he is the master. In the preferred embodiment, the "master keepalive" message contains the cluster member list, the adaptive keepalive interval (which is described in more detail below) and the current set of work assignments for each member which is used only for diagnostic purposes. So when a master gets a master keepalive message 801 he first asks "is it from me?" 803 and if so he just ignores this message 807 and exits 808. If the master keepalive message is not from this master unit 804 then the "tie-breaker" process begins by asking "Do I have more cluster members than this other master?" 809 If this master does then he sends a "other master exists" message 825 telling the other master to relinquish the master role and rejoin the cluster. The remaining master then once again sends broadcast Address Resolution Protocol (ARP) responses to tell anyone on the network what Ethernet address to use for the cluster IP address 827 and exits 808. If the current master does not have more cluster members than this other master 811 he asks "do I have less cluster members than the other master?" 813 and if so 816 he must give up the master role to the other one by exiting the cluster 821 and rejoining the cluster as a member/non-master 823) exiting to 601 in FIG. 6. If the current master does not have less members than the other master 815 (which indicates they both have the same number) then the final tie-breaker occurs by asking "is my IP address less than his?" 817 and if so then again the current master wins the tie-breaker 818 and sends the "other master exists" message as before 825 If however he loses this final tie-breaker 819 then he exits the cluster to rejoin as a non-master member 821.

Referring now to FIG. 8B another master event occurs when the master gets a "client keepalive message" (that is one from a non-master cluster member) 830. The master asks "is this client in my cluster?" 831 and if not the master sends the client an "exit cluster" message 833 telling the client to exit from this cluster. If the client is from this master's cluster the master calculates and stores a packet loss average value using the sequence number of the client keepalive message and the calculated adaptive keepalive interval. 835 The master then resets the watchdog timer for this client 837. The watchdog timer routine is an operating system routine that checks a timer value periodically to see if the failover detection interval has elapsed since the value was last reset and if so the watchdog timer is said to have expired and the system then reacts as if the client in question has left the cluster and reassigns that clients work-load to the remaining cluster members.

As indicated above, the master periodically sends out a master keepalive message containing the cluster member list, the adaptive keepalive interval (which is described in more detail below) and the current set of work assignments for each member which is used only for diagnostic purposes. (See FIG. 8C). In addition, the master periodically (in the preferred embodiment every 2 seconds) checks the load-balance of the cluster members. In FIG. 8D when the timer expires 855 the master calculates the load difference between most loaded (say "K") and least loaded (say "J") cluster member 857 and then asks "would moving 1 work unit from most loaded (K) to least loaded (J) have any effect?" that is, if K>J is K−1≧J−1? 859. If so then the master sends a "work de-assign" request to the most loaded member with the least loaded member as the target recipient 863 and then the master checks the load numbers again 865. If the result of moving 1 work unit would not leave the least loaded less than or equal to the most loaded 860 then the master makes no reassignments and exits 861.

Another master event occurs when a watchdog timer for a client/cluster member expires wherein the master deletes that client from the cluster data list and the deleted unit's work goes into a pool of unassigned work to get reassigned normally as the next message arrives. (See FIG. 8E).

Referring now to FIG. 8F another master event in the preferred embodiment occurs when the master gets a client join request message 875. The master initially tells the client to wait by sending a NAK with an "operation in progress" reason. 877 The master then notifies the applications that are present that a client is trying to join the cluster as some applications want to know about it. 879. For example if IPSec is one of the applications then IPSec may want to validate this client before agreeing to let it join the cluster. If any application rejects the join request the master sends a NAK with the reason 855 and exits. If all applications approve the join request the master sends an ACK and the join proceeds as normal. 887.

Client Cluster Member Events

The non-master cluster members (clients) must also send keepalive messages and monitor the watchdog timer for the master. Referring now to FIG. 8G when a client gets a master keepalive message 890 it updates its adaptive keepalive interval 891, and checks the list of cluster members to see if any members have been lost 893. If so this client notifies its applications that a cluster member has departed 895 (for example, IPSec wants to know). The client also checks to see if any members have been added to the cluster 897 and if so notifies the applications 898 and finally resets the watchdog timer for monitoring the master 899 and exits. Each client also has a periodic timer which is adaptive to the network packet loss value sent by the master which requires the client to send a client keepalive message (containing a monotonically increasing numeric value) to the master periodically (See FIG. 8H). Also each client has a master watchdog timer it must monitor and if it expires the client must exit the cluster and send a new join message to re-enter the cluster. (See FIG. 8I).

Normal IP Packet Processing

In order for a cluster member to correctly process only its share of the workload, one of three methods is used:

1. The MAC address of the master is bound to the cluster IP address (using the ARP protocol). The master applies the filtering function (described in more detail below) to classify the work and forward each packet (if necessary) to the appropriate cluster member.

2. A cluster-wide Unicast MAC address is bound to the cluster IP address (using the ARP protocol). Each cluster member programs its network interface to accept packets from this MAC destination address. Now each cluster member can see all packets with the cluster IP address destination. Each member applies the filtering function and discards packets that are not part of its workload.

3. method 2 is used but with a Multicast MAC address instead of a Unicast MAC address. This method is required when intelligent packet switching devices are part of the network. These devices learn which network ports are associated with each Unicast MAC address when they see packets with a Unicast MAC destination address, and they only send the packets to the port the switching device has determined is associated with that MAC address (only 1 port is associated with each Unicast MAC address). A Multicast MAC address will cause the packet switching device to deliver packets with the cluster IP destination address to all cluster members.

In the preferred embodiment, there is a mechanism for designating which cluster member is to process a message and allow the other members to disregard the message without inadvertently sending a "reset" message to the originating client. The preferred embodiment makes use of a "filter" process in each cluster member which calculates a hash function using certain fields of the incoming message header. This hash calculation serves as a means of both assigning a work unit number to a message and assigning a work unit to a particular cluster member for processing. This technique allows a cluster member to tell whether the incoming message must be processed by it, therefore the possibility of an inadvertent "reset" message is precluded. It is noted that other solutions to this problem of "how to get the work to the right member of the cluster with minimum overhead" could include a hardware filter device sitting between the network and the cluster wherein the hardware filter would do the member assignment and load balancing function. Note that since all cluster members have the same MAC address, all cluster members get all messages and the way they tell whether they must process the message further is to calculate the work unit number using the hashing method shown above and then to check the resulting work unit number against their work load table to see if it is assigned to them. If not they dump the message from their memory. This is a fast and efficient scheme for dumping messages that the units need not process further and yet it provides an efficient basis for load-balancing and efficient fail-over handling when a cluster member fails.

The normal processing of IP packets is described with reference to FIG. 9. Upon the receipt of a packet 901 a determination is made as to whether the packet is addressed to a cluster IP address 903 or not. If not 905 then it is determined if the IP address is for this cluster member and if so it is processed by the IP stack locally 909. If the packet is to be forwarded (here the system is acting like a router) 908 a forward filter is applied in order to classify the work 913.

This designates whether the packet is for normal work for the cluster clients or is forwarding work. If at step 903 where the address was checked to see if it was a cluster IP address, the answer was yes then a similar work set filter is applied 911 wherein the IP source and destination addresses are hashed modulo 1024 to produce an index value which is used for various purposes. This index value calculation (the processing filter) is required in the current embodiment and is described more fully as follows;

Basically the fields containing the IP addresses, IP protocol, and TCP/UDP port numbers, and if the application is L2TP, the session and tunnel ID fields are all added together (logical XOR) and then shifted to produce a unique "work unit" number between 0 and 1023.

For example, in the preferred embodiment the index could be calculated as follows:

```
/*
 * Sample Cluster Filtering function
 */
static int Cluster_Filtering_Function(voil*Packet, int Forwarding)
{
    struct ip *ip = (struct ip *)Packet;
    int i, length;
    /*
     * Select filtering scheme based on whether or not we are
forwarding this packet
     */
    if (Forwarding) {
        /*
         * Filter Forwarded packets on source & destination
IP address
         */
        i = ip->ip_dst.s_addr;
        i ^=ip->ip_src.s_addr;
    } else {
        /*
         * Not forwarding: Put in the IP source address
         */
        i = ip->ip_src.s_addr;
        /*
         * Get the packet header length and dispatch on protocol
         */
        length = ip->ip_hl << 2;
        if (ip->ip_p==IPPROTO_UDP) {
            /*
             * UDP: Hash on UDP Source Port and Source IP
Address
             */
            i ^=((struct udphdr *)((char *)ip + length))->uh_sport;
        } else if (ip->ip_p==IPPROTO_TCP) {
            /*
```

-continued

```
             * Hash on the TCP Source Port and Source IP Address
             */
             i = ((struct tcphdr *)((char *)ip + length))->th_sport;
        } else {
             /*
             * Any other protocol: Hash on the Destination and
Source IP Addresses
             */
             i = ip->ip_dst.s_addr;
        }
    }
    /*
    * Collapse it into a work-set number
    */
    return(IP_CLUSTER_HASH(i));
}
```

Referring again to FIG. 9, and having the work set index value calculated each member making this calculation uses the index value as an indirect pointer to determine for this work set if it is his assigned work set 915, 917. If the index value does not indicate that this work set has been assigned to this cluster member, if this cluster member is not the cluster master, then the packet is simply dropped by this cluster member 921, 923, 925. If on the other hand this cluster member is the master unit 926 then the master must check to see if this work set has been assigned to one of the other cluster members for processing 927. If it has been assigned to another cluster member 929 the master checks to see if that cluster member has acknowledged receiving the assignment 931 and if so the master checks to see if he was in the multicast mode or unicast/forwarding mode 933, 935. If he is in the unicast or multicast mode the master drops the packet because the assigned cluster member would have seen it 936. If however, the master was in the forwarding mode the master will forward the packet to the assigned member for processing 943. If the assigned cluster member has not acknowledged receiving the assignment yet 940 then save the packet until he does acknowledge the assignment 941 and then forward the packet to him to process 943. If when the master checked to see if this work set had been assigned at 927 the answer is no 928 then the master will assign this work set to the least loaded member 937 and then resume its previous task 939 until the assigned member acknowledges receipt of the assignment as described above. If work is for this member, the packet is passed on to the local TCP/IP stack.

State Maintenance

RFC 1180 A TCP/IP Tutorial, T. Socolofsky and C. Kale, January 1991 generally describes the TCP/IP protocol suite and is incorporated fully herein by reference. In the present invention, a key element is the ability to separate the TCP state into an essential portion of the state and a calculable portion of the state. For example, the state of a TCP message changes constantly and accordingly it would not be practical for a cluster member to transfer all of this TCP state to all of the other members of the cluster each time the state changed. This would require an excessive amount of storage and processing time and would essentially double the traffic to the members of the cluster. The ability of the member units to maintain the state of these incoming messages is critical to their ability to handle the failure of a member unit without requiring a reset of the message session. FIG. 7 depicts the preferred embodiment's definition of which elements of the TCP state are considered essential and therefore must be transferred to each member of the cluster 701 when it changes, and which elements of the TCP state are considered to be calculable from the essential state 703 and therefore need not be transferred to all members of the cluster when it changes. The TCP Failover State 700 in the present embodiment actually comprises three portions, an Initial State portion 702 which only needs to be sent once to all cluster members; the Essential State Portion 701 which must be sent to all cluster members for them to store when any item listed in the Essential portion changes; and the Calculable State portion 703 which is not sent to all members. The data to the right of the equals sign ("=") for each element indicates how to calculate that elements value whenever it is needed to do so.

Failover Handling

As indicated above, the preferred embodiment of the IP cluster apparatus and method also includes the ability to monitor each cluster member's operation in order to manage the cluster operation for optimal performance. This means insuring that the cluster system recognize quickly when a cluster member becomes inoperative for any reason as well as have a reasonable process for refusing to declare a cluster member inoperative because of packet losses which are inherent in any TCP/IP network. This monitoring process is done in the preferred embodiment by a method whereby each non-member cluster member keeps a "master watchdog timer" and the master keeps a "client watchdog timer" for all cluster members. These watchdog timers are merely routines whereby the cluster member's OS periodically checks a "watchdog time-value" to see if it is more than "t" time earlier than the current time (that is, to see if the watchdog time value has been reset within the last "t" time). If the routine finds that the difference between the current time and the watchdog time value is greater than "t" time then it declares the cluster member related to the watchdog timer to be inoperative. These watchdog time values are reset whenever a cluster member sends a "keepalive" packet (sometimes called a "heartbeat" message) to the other members.

Generally a "keepalive" message is a message sent by one network device to inform another network device that the virtual circuit between the two is still active. In the preferred embodiment the master unit sends a "master keepalive" packet that contains a list of the cluster members, an "adaptive keepalive interval" and a current set of work assignments for all members. The non-master cluster members monitor a Master watchdog timer to make sure the master is still alive and use the "adaptive keepalive interval" value supplied by the master to determine how frequently they (the non-master cluster members) must send their "client keepalive" packets so that the master can monitor their presence in the cluster. The "client keepalive" packets contain a monotonically increasing sequence number which is used to measure packet loss in the system and to adjust the probability of packet loss value which is used to adjust the adaptive keepalive interval. Generally these calculations are done as follows in the preferred embodiment, however it will be understood by those skilled in these arts that various programming and logical circuit processes may be used to accomplish equivalent measures of packet loss and related watchdog timer values.

Each client includes a sequence number in its "client keepalive" packet. When the master gets this keepalive packet for client "x" he makes the following calculations:

$S_A$=[this sequence number]-[last sequence number]-1

This value $S_A$ is typically=0 or 1 and represents the number of dropped packets between the last two keepalive messages, or the current packet loss for client "x".

This value is then used in an exponential smoothing formula to calculate current average packet loss "P" as follows;

$P_{new} = P_{old} \times [127/128] + S_\Delta \times [1/128]$

This $P_{new}$ then represents the probability of a lost packet, and $P^n$ (P to the nth power) would represent the probability of getting "n" successive packet losses. And $1/P^n$ would be how often we would lose "n" packets in a row.

So "n" is defined as the number of lost packets per interval, and $P^n$ then is the probability of losing "n" packets in an interval. Obviously if we lose more than some number of packets in a given interval the cluster member is either malfunctioning, inoperative or the network is having problems. In the preferred embodiment we assume "n" is a number between 2 and 20 and calculate its value adaptively as follows We call the interval "K" and set $1/K = n\,P^n$. By policy we set K=3600 (which is equivalent to a period of 1 week) and then calculate the smallest integer value of "n" for which n $P^n$. $< 1/3600$. In the preferred embodiment this is done by beginning the calculation with n=2 and increasing n by 1 iteratively until the condition is met. The resulting value of "n" is the adaptive keepalive interval which the master then sends to all of the cluster members to use in determining how often they are to send their "Client keepalive" messages.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for processing internet security protocols and tunneling protocols; for permitting the master unit to adaptively distribute processing assignments for incoming messages and for permitting cluster members to recognize which messages are theirs to process; and for recognizing messages from other members in the cluster. It will be apparent to those skilled in the art that modifications and variations of the preferred embodiment are possible, which fall within the true spirit and scope of the invention as measured by the following claims.

What is claimed is:

1. An Internet Protocol (IP) Network cluster apparatus comprising:
   a. a plurality of cluster members with all cluster members being addressable by a single dedicated Internet machine name and IP address for the cluster, each cluster member comprising a computer system having a processor, a memory, a program in said memory, a display screen and an input/output unit;
   b. a filter mechanism in each cluster member, the filter mechanism using a hashing mechanism to generate an index number for each message session received by the cluster member, the index number being used to indicate to which workset a message belongs, worksets being assigned to cluster members to balance processing load, each cluster member checking whether the workset has been assigned to it in order to determine whether the cluster member must process the message received or ignore it.

2. The apparatus of claim 1 further comprising an assignment mechanism in each cluster member, for use by a cluster member designated as a master unit, the assignment mechanism used when a message of an unassigned message session is received by the master unit, the assignment mechanism using the index number calculated by the filter mechanism to assign sets of message sessions to cluster members for further processing in order to load balance processing of incoming messages.

3. The apparatus of claim 1 further comprising a first program code mechanism in each of the plurality of cluster members configured to save state for each message session including TCP state.

4. The apparatus of claim 3 further comprising a second program code mechanism in each of the plurality of cluster members configured to transfer an essential portion of the saved state for each message session to each of the other cluster members, whenever required.

5. The apparatus of claim 4 further comprising a third program code mechanism in each of the plurality of cluster members configured to permit a cluster member acting as a master unit to recognize an equipment failure in one of the other members in the cluster, to reassign the work of the failed cluster member to remaining members in the cluster thereby rebalancing the processing load and maintaining the message sessions.

6. The apparatus of claim 5 further comprising a fourth program code mechanism in each of the plurality of cluster members configured to permit units which are not acting as the master unit to recognize an equipment failure in the master unit, to immediately and cooperatively designate one of the remaining cluster members as a new master unit, the new master unit to reassign the work of the failed cluster member to remaining cluster members thereby rebalancing the processing load and maintaining the message sessions.

7. The apparatus of claim 1 wherein the memory of each of the cluster members includes a flash memory card containing a program code mechanism which describes the personality of the cluster member including its cluster address.

8. A method for operating a plurality of computers in an Internet Protocol (IP) Network cluster, the cluster providing a single-system-image to network users, the method comprising the steps of;
   a. providing a plurality of cluster members, each cluster member comprising a computer system having a processor, a memory, a program in said memory, a display screen and an input/output unit;
   b. interconnecting the cluster members together, and assigning all cluster members a same internet machine name and a same IP address whereby a message arriving at the cluster will be recognized by the appropriate member in the cluster and an output from any cluster member will be recognized as coming from the cluster, and whereby the cluster members can communicate with each other; and
   c. providing a filter mechanism in each cluster member, the filter mechanism using a hashing mechanism to generate an index number for each message session received by the cluster member, the index number being used to indicate to which workset a message belongs, worksets being assigned to cluster members to balance processing load, each cluster member checking whether the workset has been assigned to it in order to determine whether the cluster member must process the message received or ignore it.

9. The method of claim 8 further comprising an assignment mechanism in each cluster member, for use by a cluster member designated as a master unit, the assignment mechanism used when a message of an unassigned message session is received by the master unit, the assignment mechanism using the index number calculated by the filter mechanism to assign sets of message sessions to cluster members for further processing in order to load balance processing of incoming messages.

10. The method of claim 8 comprising the additional step of each cluster member saving state for each message session connection including TCP state, and for segregating this state into an essential state portion and a non-essential state portion.

11. The method of claim 10 comprising the additional step of each cluster member transferring to each other cluster member the saved essential state portion for message sessions for which that cluster member is responsible, such transfer to be made whenever the essential portion of the state changes, whereby all cluster members maintain essential state for all message session connections.

12. The method of claim 11 comprising the additional step of each cluster member recognizing the equipment failure of one of the cluster members, immediately reassigning a task of being the master if it is the master unit that failed, the master unit reassigning the work which was assigned to the failed cluster member, rebalancing the load on the remaining tunnel-servers.

13. An Internet Protocol (IP) network cluster apparatus comprising:
   a. a plurality of interconnected cluster members, each cluster member comprising a computer system having a processor, a memory, a program in said memory, a display screen and an input/output unit;
   b. means in each of the plurality of cluster members for recognizing other members of the plurality of cluster members which are connected together and cooperating with the other members to adaptively designate a master unit; and
   c. means for generating an index number for each message session received by a cluster member, the index number being used to indicate whether the cluster member must process the message received or ignore it.

14. The apparatus of claim 13 further comprising means in each of the plurality of cluster members for saving essential state for each message session.

15. The apparatus in claim 14 further comprising means in each of the plurality of cluster members for periodically transferring the saved essential state for each message session to each of the other members in the cluster.

16. The apparatus of claim 15 further comprising means in each of the plurality of cluster members for permitting a cluster member acting as a master unit to recognize an equipment failure in one of the other cluster members, and for reassigning work of the failed cluster member to remaining members in the cluster thereby rebalancing the processing load and maintaining message session connections, and for permitting cluster members which are not acting as a master unit to recognize an equipment failure in the master unit, to immediately and cooperatively designate one of the remaining cluster members as a new master unit, the new master unit to reassign work of the failed cluster member to remaining members in the cluster thereby rebalancing the processing load and maintaining message session connections.

* * * * *